United States Patent
Jin et al.

(10) Patent No.: US 12,438,436 B2
(45) Date of Patent: Oct. 7, 2025

(54) POWER CONVERTER

(71) Applicant: Delta Electronics, Inc., Taoyuan (TW)

(72) Inventors: Da Jin, Shanghai (CN); Yahong Xiong, Shanghai (CN); Qinghua Su, Shanghai (CN)

(73) Assignee: Delta Electronics, Inc., Taoyuan (TW)

( * ) Notice: Subject to any disclaimer, the term of this patent is extended or adjusted under 35 U.S.C. 154(b) by 216 days.

(21) Appl. No.: 18/086,481

(22) Filed: Dec. 21, 2022

(65) Prior Publication Data
US 2023/0268820 A1 Aug. 24, 2023

(30) Foreign Application Priority Data
Feb. 22, 2022 (CN) .......................... 202210160584.3

(51) Int. Cl.
*H02M 3/07* (2006.01)
*H02M 1/00* (2006.01)

(52) U.S. Cl.
CPC ............ *H02M 1/0054* (2021.05); *H02M 3/07* (2013.01)

(58) Field of Classification Search
CPC ........ H02M 3/07; H02M 3/071; H02M 3/072; H02M 3/073; H02M 3/075; H02M 3/076; H02M 3/077; H02M 3/078; H02M 1/0054; H02M 1/0058
See application file for complete search history.

(56) References Cited

U.S. PATENT DOCUMENTS

| 7,230,405 B2 | 6/2007 | Jang et al. | |
|---|---|---|---|
| 11,362,576 B1* | 6/2022 | Rizzolatti | H02M 3/07 |
| 2022/0006372 A1* | 1/2022 | Jin | H02M 1/0064 |
| 2023/0006564 A1* | 1/2023 | Elsayad | H02M 7/4826 |

FOREIGN PATENT DOCUMENTS

| CN | 204131085 U | 1/2015 |
|---|---|---|
| CN | 112491269 A | 3/2021 |

* cited by examiner

*Primary Examiner* — Nguyen Tran
(74) *Attorney, Agent, or Firm* — KIRTON McCONKIE; Evan R. Witt (57) ABSTRACT

The present disclosure provides a power converter including an input capacitor, an input switch, first and second bridge arms, first and second storage capacitors, two output inductors and an output capacitor. The first and second bridge arms are connected in parallel between a second terminal of the input switch and the ground terminal. The first bridge arm includes three switches connected in series and has first upper and lower nodes therebetween. The second bridge arm includes three switches connected in series and has second upper and lower nodes therebetween. The first storage capacitor is coupled between the first upper node and the second lower node. The second storage capacitor is coupled between the second upper node and the first lower node. The input switch is configured to block a rush current between the input capacitor and the first storage capacitor and/or the second storage capacitor.

19 Claims, 7 Drawing Sheets

POWER CONVERTER

CROSS-REFERENCE TO RELATED APPLICATION

This application claims priority to China Patent Application No. 202210160584.3, filed on Feb. 22, 2022, the entire contents of which are incorporated herein by reference for all purposes.

FIELD OF THE INVENTION

The present disclosure relates to the field of power electronics technology, and more particularly to a power converter.

BACKGROUND OF THE INVENTION

Conventionally, in the server mainboard, the voltage of the power bus usually adopts a stable voltage of 12V. In one aspect, the power bus voltage of 12V is converted by a buck converter to 0.8V or 1.8V voltage for supplying the loads like CPU (central processing unit), GPU (graphics processing unit), and ASIC (application specific integrated circuit). On the other hand, the power bus voltage of 12V may be directly provided to the loads like memory or fan. When the power bus adopts the stable voltage of 12V, the power supply requirement for CPU is satisfied, and meanwhile the requirement for narrow supply voltage range of the loads like memory and fan is satisfied as well.

However, as the power consumption of the chips on the server mainboard getting higher and higher, the power bus voltage of the server mainboard is changing from the conventional 12V to 54V for reducing the parasitic resistance loss of the power bus of the server mainboard. Accordingly, a bus voltage converter is utilized to convert the 54V supply voltage into a stable 12V output voltage. Since disposing a bus voltage converter additionally would cause corresponding losses, the conversion efficiency of the bus voltage converter is required to be extremely high in practical applications.

Figure 1:
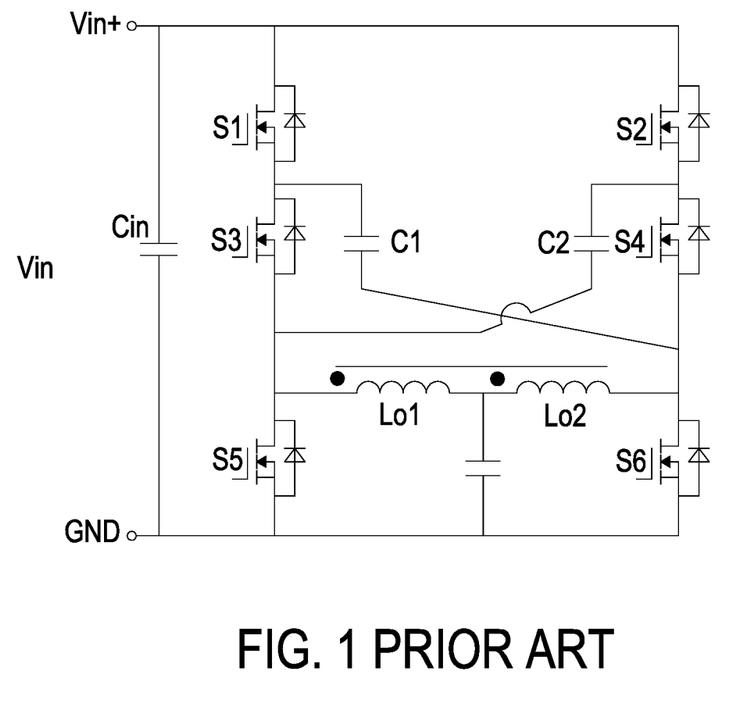
FIG. 1 is a schematic circuit diagram illustrating a conventional switch capacitor buck circuit topology.

U.S. Pat. No. 7,230,405 B2 discloses a switch capacitor buck circuit topology as shown in FIG. 1. In the application of converting 54V input to a stable 12V output, compared with the conventional buck circuit topology, the switch capacitor buck circuit topology shown in FIG. 1 has advantages of double duty ratio, significant decrement of rms current, significant decrement of switch stress, etc. Therefore, the conversion efficiency is greatly increased. However, this switch capacitor buck circuit also has an obvious disadvantage that it is not suitable for applications with wide input voltage range (e.g., 40-60V). In specific, when the input voltage is lower than 48V, the duty ratio would be greater than 50% in order to maintain the stable 12V output, and the voltage across the storage capacitors C1 and C2 is unequal to the voltage across the input capacitor Cin while switching switches. When the switch S1 is turned on, the storage capacitor C1 is directly connected to the input capacitor Cin, and the difference between the voltages on two terminals of the switch S1 may cause the current rush between the storage capacitor C1 and the input capacitor Cin or among the storage capacitors C1 and C2 and the input capacitor Cin. When the switch S2 is turned on, the storage capacitor C2 is directly connected to the input capacitor Cin, and the difference between the voltages on two terminals of the switch S2 may cause the current rush between the storage capacitor C2 and the input capacitor Cin or among the storage capacitors C1 and C2 and the input capacitor Cin. Moreover, the lower the input voltage is, the larger the duty ratio is larger, resulting in larger current rush. Consequently, the efficiency of converter is reduced and more heat energy is generated, which may cause safety risk.

Therefore, there is a need of providing a power converter in order to overcome the drawbacks of the conventional technologies.

SUMMARY OF THE INVENTION

The present disclosure provides a power converter. The power converter eliminates the current rush caused by switching switches through controlling the input switch, thereby reducing losses and increasing the efficiency of the power converter. Meanwhile, the heat energy generated by the power converter is reduced, and the operation safety of the power converter is enhanced.

In accordance with an aspect of the present disclosure, a power converter is provided. The power converter includes a positive input terminal, a ground terminal, a positive output terminal, a negative output terminal, an input capacitor, an input switch, a first bridge arm, a second bridge arm, a first storage capacitor, a second storage capacitor, a first output inductor, a second output inductor and an output capacitor. The negative output terminal is coupled to the ground terminal. A first terminal and a second terminal of the input capacitor are electrically connected to the positive input terminal and the ground terminal respectively. A first terminal of the input switch is electrically connected to the first terminal of the input capacitor. The first bridge arm is electrically connected between a second terminal of the input switch and the ground terminal and includes a first upper switch, a first middle switch and a first lower switch electrically connected in series. The first upper switch and the first lower switch are electrically connected to the second terminal of the input switch and the ground terminal respectively. The first upper switch is connected to the first middle switch to form a first upper node, and the first middle switch is connected to the first lower switch to form a first lower node. The second bridge arm is electrically connected to the first bridge arm in parallel and includes a second upper switch, a second middle switch and a second lower switch electrically connected in series. The second upper switch and the second lower switch are electrically connected to the second terminal of the input switch and the ground terminal respectively. The second upper switch is connected to the second middle switch to form a second upper node, and the second middle switch is connected to the second lower switch to form a second lower node. The first storage capacitor is coupled between the first upper node and the second lower node. The second storage capacitor is coupled between the second upper node and the first lower node. The first output inductor is electrically connected between the first lower node and the positive output terminal. The second output inductor is electrically connected between the second lower node and the positive output terminal. The output capacitor is coupled between the positive output terminal and the negative output terminal. The input switch is configured to block a rush current between the input capacitor and the first storage capacitor and/or the second storage capacitor.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

Figure 2:
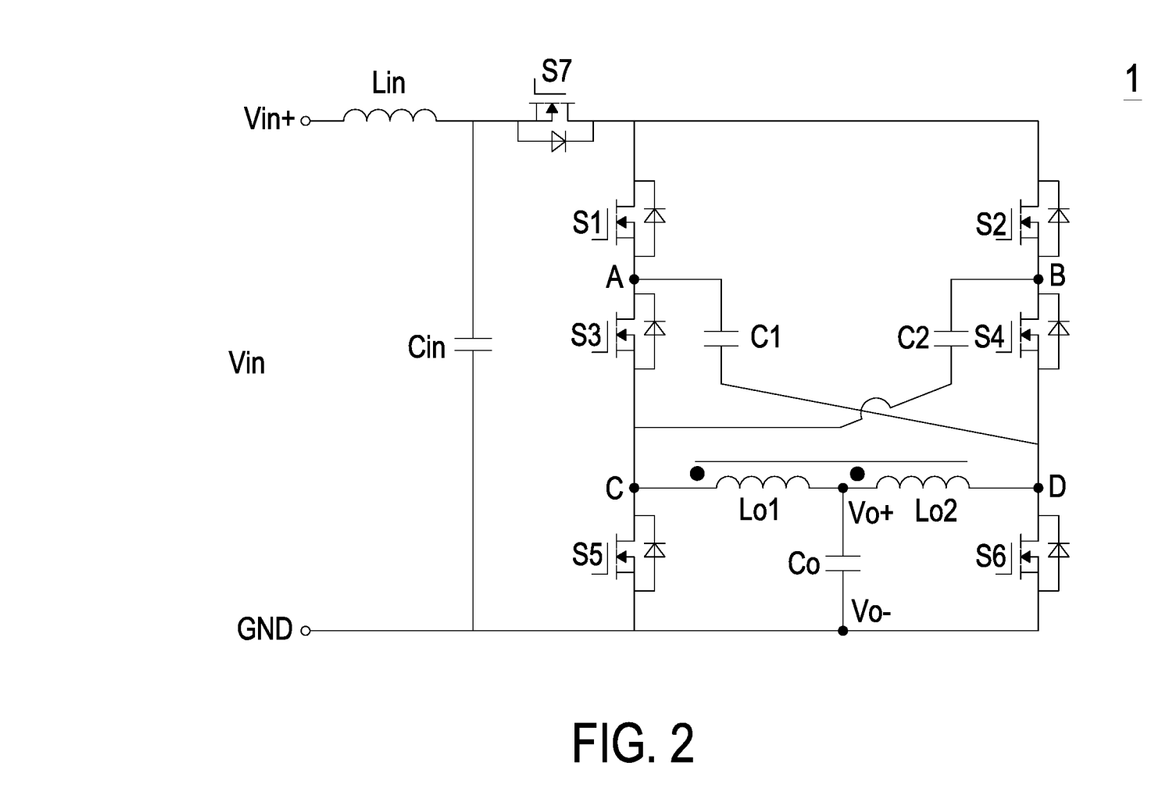
FIG. 2 is a schematic circuit diagram illustrating a power converter according to an embodiment of the present disclosure.

FIG. 2 is a schematic circuit diagram illustrating a power converter according to an embodiment of the present disclosure. As shown in FIG. 2, the power converter 1 includes a positive input terminal Vin+, a ground terminal GND (i.e., a negative input terminal), a positive output terminal Vo+ and a negative output terminal Vo−. The positive input terminal Vin+ and the ground terminal GND collaboratively receive an input voltage Vin, the voltage between the positive output terminal Vo+ and the negative output terminal Vo− is the output voltage Vo, and the negative output terminal Vo− is coupled to the ground terminal GND. The power converter 1 further includes an input capacitor Cin, an input switch S7, a first bridge arm, a second bridge arm, a first storage capacitor C1, a second storage capacitor C2, a first output inductor Lo1, a second output inductor Lo2, and an output capacitor Co. The first terminal and second terminal of the input capacitor Cin are electrically connected to the positive input terminal Vin+ and the ground terminal GND respectively. The first terminal of the input switch S7 is electrically connected to the first terminal of the input capacitor Cin. The first bridge arm is electrically connected between the second terminal of the input switch S7 and the ground terminal GND and includes a first upper switch S1, a first middle switch S3 and a first lower switch S5 electrically connected in series. The first upper switch S1 and the first lower switch S5 are electrically connected to the second terminal of the input switch S7 and the ground terminal GND respectively. The first upper switch S1 is connected to the first middle switch S3 to form a first upper node A, and the first middle switch S3 is connected to the first lower switch S5 to form a first lower node C. The second bridge arm is electrically connected to the first bridge arm in parallel and includes a second upper switch S2, a second middle switch S4 and a second lower switch S6 electrically connected in series. The second upper switch S2 and the second lower switch S6 are electrically connected to the second terminal of the input switch S7 and the ground terminal GND respectively. The second upper switch S2 is connected to the second middle switch S4 to form a second upper node B, and the second middle switch S4 is connected to the second lower switch S6 to form a second lower node D. The first storage capacitor C1 is coupled between the first upper node A and the second lower node D, and the second storage capacitor C2 is coupled between the second upper node B and the first lower node C. The first output inductor Lo1 is electrically connected between the first lower node C and the positive output terminal Vo+. The second output inductor Lo2 is electrically connected between the second lower node D and the positive output terminal Vo+. The output capacitor Co is coupled between the positive output terminal Vo+ and the negative output terminal Vo−. In an embodiment, the power converter 1 further includes an input inductor Lin coupled between the positive input terminal Vin+ and the first terminal of the input capacitor Cin.

In an embodiment, the first upper switch S1, the first middle switch S3 and the first lower switch S5 are field effect transistors. The drain and source of the first upper switch S1 are coupled to the second terminal of the input switch S7 and the first upper node A respectively. The drain and source of the first middle switch S3 are coupled to the first upper node A and the first lower node C respectively. The drain and source of the first lower switch S5 are coupled to the first lower node C and the ground terminal GND respectively.

In an embodiment, the second upper switch S2, the second middle switch S4 and the second lower switch S6 are field effect transistors. The drain and source of the second upper switch S2 are coupled to the second terminal of the input switch S7 and the second upper node B respectively. The drain and source of the second middle switch S4 are coupled to the second upper node B and the second lower node D respectively. The drain and source of the second lower switch S6 are coupled to the second lower node D and the ground terminal GND respectively.

The power converter 1 of the present disclosure not only can be applied to the applications with the duty ratio less than or equal to 50% (e.g., Vin≥48V and Vo=12V) but also can be applied to the applications with the duty ratio greater than 50% (e.g., Vin<48V and Vo=12V). Moreover, when the duty ratio is greater than 50%, the power converter 1 eliminates the current rush caused by switching switches through controlling the input switch S7, thereby reducing losses and increasing the efficiency of the power converter 1. Meanwhile, the heat energy generated by the power converter 1 is reduced, and the operation safety of the power converter 1 is enhanced. The specific operation of the power converter 1 is exemplified as follows according to FIG. 3 and FIG. 4.

Figure 3:
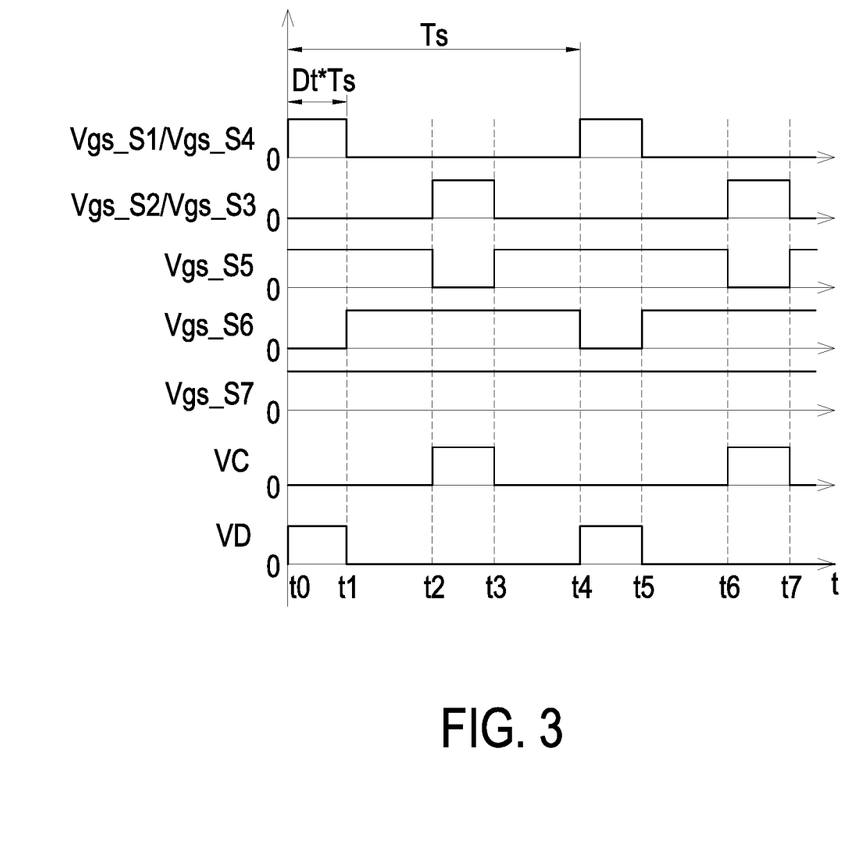
FIG. 3 is a schematic oscillogram showing the work waveforms of the power converter of FIG. 2 operating with the duty ratio less than or equal to 50%.
Figure 4:
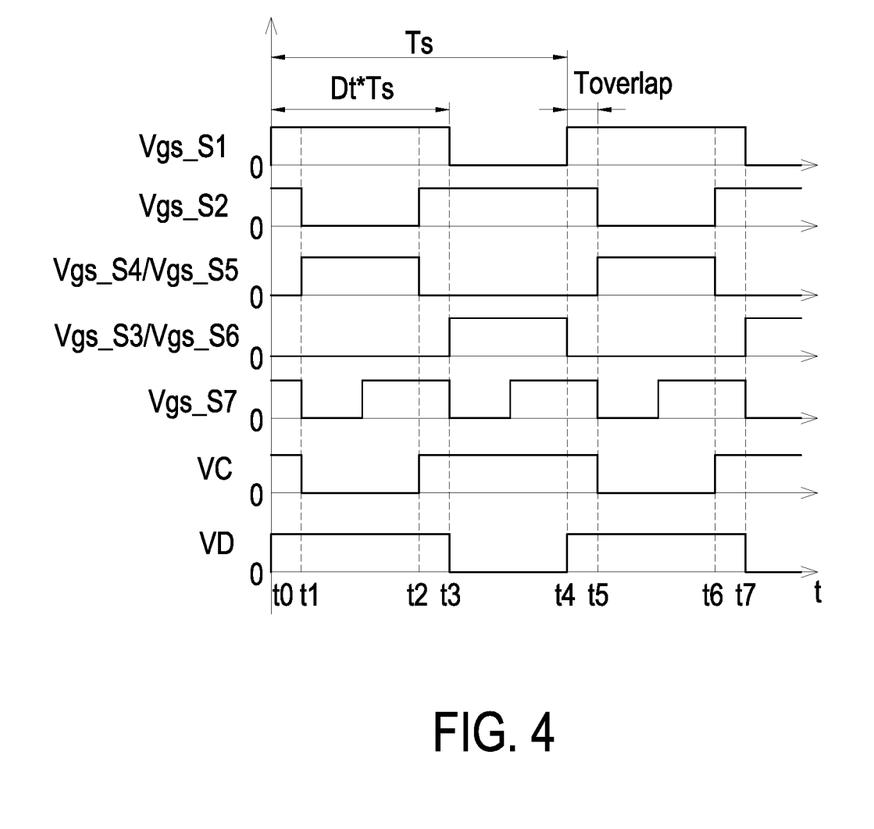
FIG. 4 is a schematic oscillogram showing the work waveforms of the power converter of FIG. 2 operating with the duty ratio greater than 50%.

FIG. 3 is a schematic oscillogram showing the work waveforms of the power converter of FIG. 2 operating with the duty ratio less than or equal to 50%, and FIG. 4 is a schematic oscillogram showing the work waveforms of the power converter of FIG. 2 operating with the duty ratio greater than 50%. In FIG. 3 and FIG. 4, Vgs_S1, Vgs_S2, Vgs_S3, Vgs_S4, Vgs_S5, Vgs_S6 and Vgs_S7 represent the control signals of the first upper switch S1, the second upper switch S2, the first middle switch S3, the second middle switch S4, the first lower switch S5, the second lower switch S6 and the input switch S7 respectively. Ts represents the switching cycle of the first upper switch S1 and the second upper switch S2, i.e., the switching cycle of the power converter 1. Dt represents the duty ratio of the first upper switch S1 and the second upper switch S2. VC represents the voltage to ground on the first lower node C, and VD represents the voltage to ground on the second lower node D.

Please refer to FIG. 2 and FIG. 3. When the duty ratio of the power converter 1 (i.e., the duty ratio Dt of the first upper switch S1 and the second upper switch S2) is less than or equal to 50%, the control signal Vgs_S1 of the first upper switch S1 and the control signal Vgs_S2 of the second upper switch S2 are out of phase with respect to each other by 180 degrees. The control signal Vgs_S5 of the first lower switch S5 is complementary to the control signal Vgs_S2 of the second upper switch S2. The control signal Vgs_S6 of the second lower switch S6 is complementary to the control signal Vgs_S1 of the first upper switch S1. The first middle switch S3 and the second upper switch S2 are turned on and off synchronously, and the second middle switch S4 and the first upper switch S1 are turned on and off synchronously. The input switch S7 is kept in the on state.

Under this circumstance, the voltage VC of the first lower node C and the control signal Vgs_S2 of the second upper switch S2 have the same frequency, duty ratio and phase. When the second upper switch S2 is turned on, the amplitude of the voltage VC is substantially equal to Vin/2. The voltage VD of the second lower node D and the control signal Vgs_S1 of the first upper switch S1 have the same frequency, duty ratio and phase. When the first upper switch S1 is turned on, the amplitude of the voltage VD is substantially equal to Vin/2. The output voltage Vo satisfies the equation:

$$Vo=Vin*Dt/2.$$

Please refer to FIG. 2 and FIG. 4. When the duty ratio of the power converter 1 (i.e., the duty ratio Dt of the first upper switch S1 and the second upper switch S2) is greater than 50%, the control signal Vgs_S1 of the first upper switch S1 and the control signal Vgs_S2 of the second upper switch S2 are out of phase with respect to each other by 180 degrees. The control signal Vgs_S5 of the first lower switch S5 is complementary to the control signal Vgs_S2 of the second upper switch S2. The control signal Vgs_S6 of the second lower switch S6 is complementary to the control signal Vgs_S1 of the first upper switch S1. The first middle switch S3 and the second lower switch S6 are turned on and off synchronously, and the second middle switch S4 and the first lower switch S5 are turned on and off synchronously. The switching frequency of the input switch S7 is twice the switching frequency of the first upper switch S1, and the input switch S7 is alternate to turn off with the first upper switch S1 synchronously and to turn off with the second upper switch S2 synchronously. When the voltage across the first bridge arm or the second bridge arm is lower than or equal to the voltage across the input capacitor Cin, the input switch S7 is turned on. In one switching cycle of the input switch S7, as shown in the period from time t1 to t3 in FIG. 4, the turn-on duration of the input switch S7 is preferably but not limited to equal 0.5*Ts−2*Toverlap, where Toverlap is the duration of the first upper switch S1 and the second upper switch S2 both being in the on state in half switching cycle (e.g., the period from time t4 to t5 or the period from time t2 to t3 in FIG. 4). In an embodiment, the turn-on duration of the input switch S7 decreases as the duration Toverlap increases.

Under this circumstance, the voltage VC of the first lower node C and the control signal Vgs_S2 of the second upper switch S2 have the same frequency, duty ratio and phase. When the second upper switch S2 is turned on, the amplitude of the voltage VC is substantially equal to Vin/2. The voltage VD of the second lower node D and the control signal Vgs_S1 of the first upper switch S1 have the same frequency, duty ratio and phase. When the first upper switch S1 is turned on, the amplitude of the voltage VD is substantially equal to Vin/2. The output voltage Vo satisfies the equation:

$$Vo=Vin*Dt/2.$$

In addition, as shown in FIG. 2 and FIG. 4, at time t3, the first upper switch S1 is turned off, and then a series voltage is formed across the first storage capacitor C1 and the second storage capacitor C2 through the second upper switch S2, the first middle switch S3 and the second lower switch S6 which are in the on state. If the series voltage is higher than the input voltage Vin and the second upper switch S2 is in the on state, the difference between the voltages on two terminals of the second upper switch S2 would cause the current rush between the second storage capacitor C2 and the input capacitor Cin or among the storage capacitors C1 and C2 and the input capacitor Cin. Therefore, at time t3, the input switch S7 is turned off to block the current rush, caused by the series voltage, to the input capacitor Cin. Afterwards, the first storage capacitor C1 is discharged to the first output inductor Lo1 through the first middle switch S3 which is in the on state. When the series voltage is substantially equal to or lower than the voltage of the input capacitor Cin, the input switch S7 is turned on so that the input voltage Vin supplies power to the second storage capacitor C2 and the first output inductor Lo1.

As shown in FIG. 2 and FIG. 4, at time t5, the second upper switch S2 is turned off, and then a series voltage is formed across the first storage capacitor C1 and the second storage capacitor C2 through the first upper switch S1, the second middle switch S4 and the first lower switch S5 which are in the on state. If the series voltage is higher than the input voltage Vin and the first upper switch S1 is in the on state, the difference between the voltages on two terminals of the first upper switch S1 would cause the current rush between the first storage capacitor C1 and the input capacitor Cin or among the storage capacitors C1 and C2 and the input capacitor Cin. Therefore, at time t5, the input switch S7 is turned off to block the current rush, caused by the series voltage, to the input capacitor Cin. Afterwards, the second storage capacitor C2 is discharged to the second output inductor Lo2 through the second middle switch S4 which is in the on state. When the series voltage is substantially equal to or lower than the voltage of the input capacitor Cin, the input switch S7 is turned on so that the input voltage Vin supplies power to the first storage capacitor C1 and the second output inductor Lo2.

According to the switching sequence shown in FIG. 4, when the first upper switch S1 or the second upper switch S2 is switched from on state to off state, the input switch S7 is switched to off state at the same time to block the current rush, caused by the series voltage across the first storage capacitor C1 and the second storage capacitor C2, to the input capacitor Cin. Consequently, the current rush caused by switching switches is eliminated, thereby reducing losses and increasing the efficiency of the power converter 1. Meanwhile, the heat energy generated by the power converter 1 is reduced, and the operation safety of the power converter 1 is enhanced.

In the embodiment shown in FIG. 2 to FIG. 4, the input switch S7 further includes a parasitic diode. An anode of the parasitic diode is electrically connected to the first terminal of the input switch S7 (i.e., the first terminal of the input capacitor Cin), and a cathode of the parasitic diode is electrically connected to the second terminal of the input switch S7. When the voltage across the first bridge arm is lower than or equal to the voltage across the input capacitor Cin, the parasitic diode of the input switch S7 is turned on, and then the input switch S7 is turned on. In another embodiment, the function of the parasitic diode of the input switch S7 may be implemented by an additional diode, and the anode and cathode of the additional diode are electrically connected to the first terminal and second terminal of the input switch S7 respectively. When the voltage across the first bridge arm is lower than or equal to the voltage across the input capacitor Cin, the additional diode is turned on, and then the input switch S7 is turned on. In some embodiments, the input switch S7 is for example but not limited to MOSFET, SiC transistor or GaN transistor.

Please refer to FIG. 2 again. The first output inductor Lo1 and the second output inductor Lo2 are two independent inductors in some embodiments, but not limited thereto. In some other embodiments, the first output inductor Lo1 and the second output inductor Lo2 are wound around the same magnetic core component to form an inverse coupling inductor. In the embodiment shown in FIG. 2, the first terminal and second terminal of the first output inductor Lo1 are electrically connected to the first lower node C and the positive output terminal Vo+ respectively, and the first terminal and second terminal of the second output inductor Lo2 are electrically connected to the second lower node D and the positive output terminal Vo+ respectively. The first terminal of the first output inductor Lo1 and the first terminal of the second output inductor Lo2 are opposite in polarity. On the other hand, the first terminal of the first output inductor Lo1 and the second terminal of the second output inductor Lo2 are identical in polarity and are both dotted terminals (marked with black dots). The absolute value of the coupling coefficient between the first output inductor Lo1 and the second output inductor Lo2 is for example but not limited to be greater than 0.33, 0.5, 0.9 or 0.95.

Figure 5:
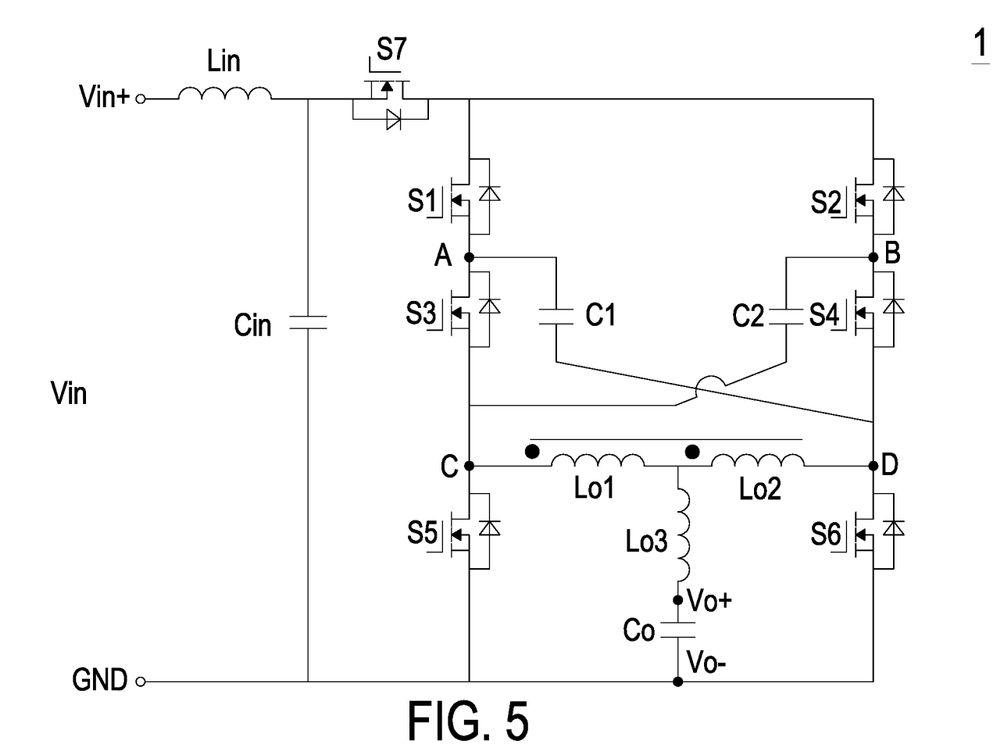
FIG. 5, FIG. 6 and FIG. 7 are schematic circuit diagrams showing variants of the power converter of FIG. 2.

Moreover, in an embodiment, under the circumstance that the first output inductor Lo1 and the second output inductor Lo2 form an inverse coupling inductor, as shown in FIG. 5, the power converter 1 further includes a third output inductor Lo3. A first terminal of the third output inductor Lo3 is electrically connected to the second terminal of the first output inductor Lo1 and the second terminal of the second output inductor Lo2, and a second terminal of the third output inductor Lo3 is electrically connected to the positive output terminal Vo+. Through disposing the third output inductor Lo3 as an additional inductor, the size of the inverse coupling inductor formed by the first output inductor Lo1 and the second output inductor Lo2 is greatly reduced. In specific, with the same output filtering characteristic, the size of the inverse coupling inductor and the additional inductor of FIG. 5 are both smaller than the size of the inverse coupling inductor of FIG. 2, which makes the spatial arrangement more flexible and reduces the total losses in the applications of converters with high power density.

In addition, as shown in FIG. 2, when the first storage capacitor C1 and the second storage capacitor C2 operate in a steady state, the average DC voltages thereof are both substantially equal to Vin/2. However, before the power converter 1 is started initially, the average DC voltages of the first storage capacitor C1 and the second storage capacitor C2 are substantially equal to 0. Namely, during the process of starting the power converter 1 (i.e., the process of the duty ratio Dt of the first upper switch S1 and the second upper switch S2 gradually increasing from 0), the voltage across the input capacitor Cin would generate a current rush to the series voltage across the first storage capacitor C1 and the second storage capacitor C2, which causes losses and affects the reliability of the power converter 1.

Figure 6:
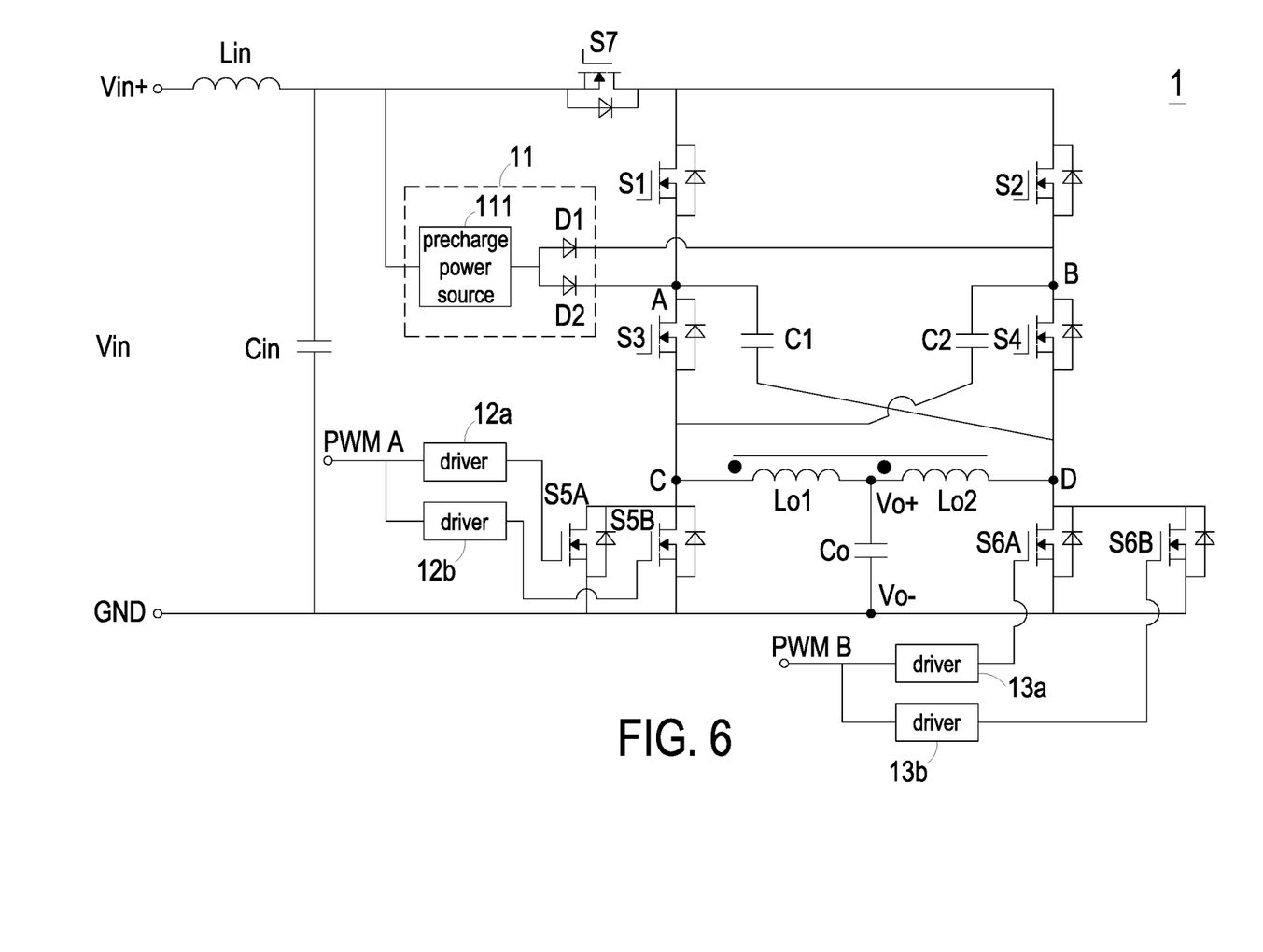

For this reason, in an embodiment as shown in FIG. 6, the power converter 1 further includes a precharge circuit 11 electrically connected to the positive input terminal Vin+, the first storage capacitor C1 and the second storage capacitor C2. The precharge circuit 11 is configured to provide a precharge voltage for precharging the first storage capacitor C1 and the second storage capacitor C2 while starting the power converter 1, where the precharge voltage is equal to Vin/2. In an embodiment, the precharge circuit 11 includes a precharge power source 111, a first precharge switch D1 and a second precharge switch D2. The first precharge switch D1 and the second precharge switch D2 may be diodes or active switches (e.g., MOSFETs, SiC transistors, or GaN transistors), and the precharge switches D1 and D2 in FIG. 6 are exemplified as diodes. The precharge power source 111 is electrically connected to the first terminal of the input capacitor Cin. The anode and cathode of the first precharge switch D1 are electrically connected to the precharge power source 111 and the second upper node B respectively. The anode and cathode of the second precharge switch D2 are electrically connected to the precharge power source 111 and the first upper node A respectively. The positive input terminal Vin+, the precharge power source 111, the first precharge switch D1, the second storage capacitor C2, the first output inductor Lo1, the output capacitor Co, the input capacitor Cin and the ground terminal GND form a first precharge loop for precharging the voltage of the second storage capacitor C2 to Vin/2. The positive input terminal Vin+, the precharge power source 111, the second precharge switch D2, the first storage capacitor C1, the second output inductor Lo2, the output capacitor Co, the input capacitor Cin and the ground terminal GND form a second precharge loop for precharging the voltage of the first storage capacitor C1 to Vin/2. Consequently, through disposing the precharge circuit 11 to precharge the first storage capacitor C1 and the second storage capacitor C2, the voltage across the input capacitor Cin is prevented from causing the current rush to the series voltage across the first storage capacitor C1 and the second storage capacitor C2 while starting the power converter 1, thereby avoiding loss and improving the reliability of the power converter 1.

In an embodiment, as shown in FIG. 6, the first lower switch of the power converter 1 includes two switches S5A and S5B electrically connected in parallel. These two switches S5A and S5B have the same control signal (PWMA) and are driven by drivers 12a and 12b respectively. Further, the first upper switch S1 and the first middle switch S3 are respectively driven by the corresponding drivers (not shown), and the drivers 12a and 12b and the drivers for driving the first upper switch S1 and the first middle switch S3 all have the same specification. Therefore, the drivers for the switches have identical specification, which is beneficial for management. In addition, the switching speed of the switches S5A and S5B is close to that of the first upper switch S1 and the first middle switch S3, thereby reducing the switching loss of the first lower switch and improving the efficiency of the power converter 1.

Similarly, in an embodiment, as shown in FIG. 6, the second lower switch of the power converter 1 includes two switches S6A and S6B electrically connected in parallel. These two switches S6A and S6B have the same control signal (PWMB) and are driven by drivers 13a and 13b respectively. Further, the second upper switch S2 and the second middle switch S4 are respectively driven by the corresponding drivers (not shown), and the drivers 13a and 13b and the drivers for driving the second upper switch S2 and the second middle switch S4 all have the same specification. Therefore, the drivers for the switches have identical specification, which is beneficial for management. In addition, the switching speed of the switches S6A and S6B is close to that of the second upper switch S2 and the second middle switch S4, thereby reducing the switching loss of the second lower switch and improving the efficiency of the power converter 1.

In addition, in FIG. 2, at the moment of turning off the first middle switch S3, the drain-source voltage of the first middle switch S3 is clamped by the closed loop formed by the first storage capacitor C1, the parasitic diode of the second middle switch S4, and the second storage capacitor C2. Similarly, at the moment of turning off the second middle switch S4, the drain-source voltage of the second middle switch S4 is clamped by the closed loop formed by the second storage capacitor C2, the parasitic diode of the first middle switch S3, and the first storage capacitor C1. However, at the moment of turning off the first upper switch S1, the first lower switch S5, the second upper switch S2 or the second lower switch S6, there is no circuit capable of clamping the drain-source voltage of the corresponding switch.

Figure 7:
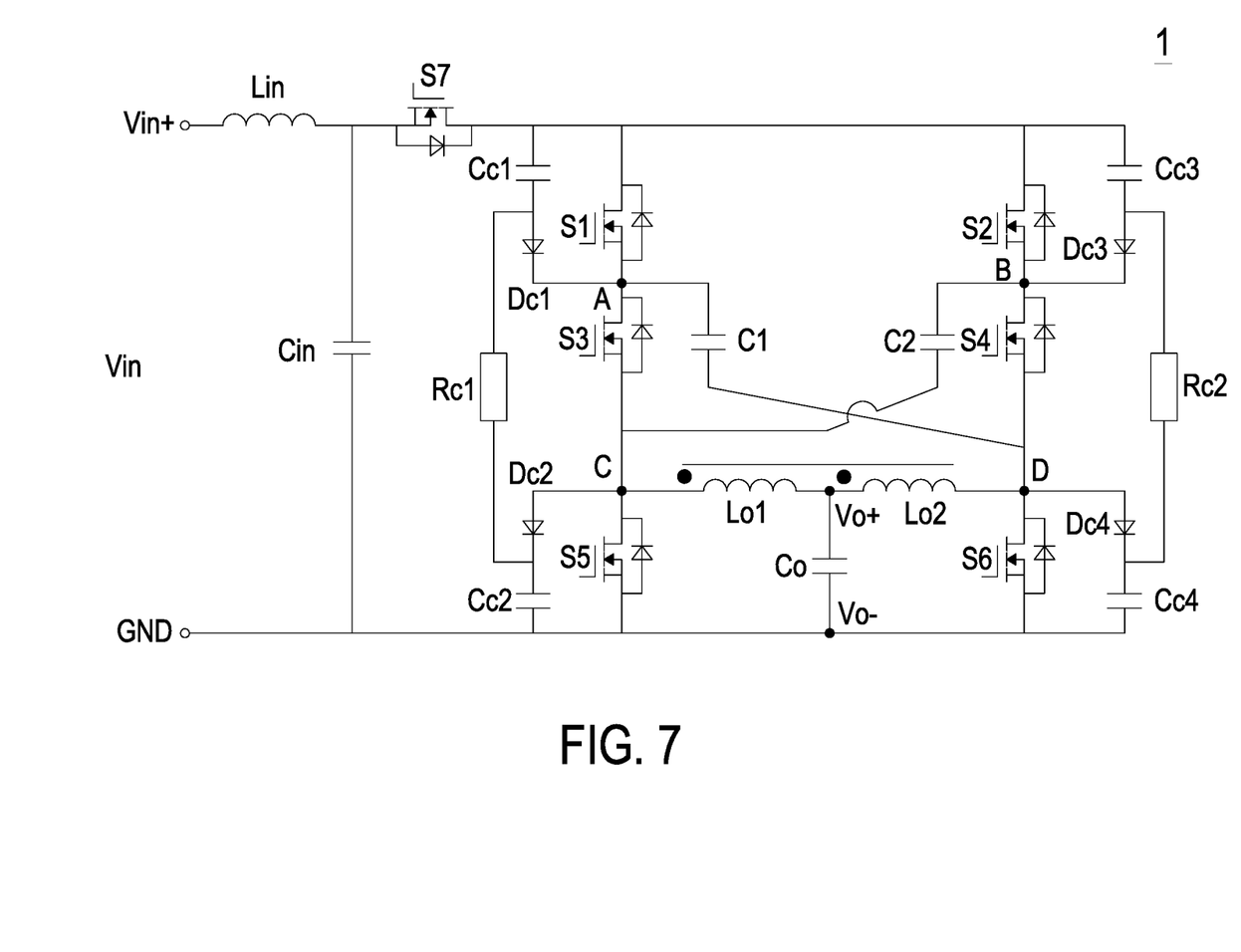

For this reason, in an embodiment, as shown in FIG. 7, the power converter 1 further includes a first clamping circuit, a second clamping circuit and a first clamping resistor Rc1. The first clamping circuit is electrically connected to the first upper switch S1 in parallel and includes a first clamping capacitor Cc1 and a first clamping switch Dc1 electrically connected in series. The first clamping switch Dc1 may be a diode or an active switch, and the first clamping switch Dc1 in FIG. 7 is exemplified as a diode. The first terminal and second terminal of the first clamping capacitor Cc1 are coupled to the drain of the first upper switch S1 and the anode of the first clamping switch Dc1 respectively, and the cathode of the first clamping switch Dc1 is coupled to the source of the first upper switch S1. The first clamping circuit is configured to absorb the peak energy of the drain-source voltage at the moment of turning off the first upper switch S1 for clamping. The second clamping circuit is electrically connected to the first lower switch S5 in parallel and includes a second clamping capacitor Cc2 and a second clamping switch Dc2 electrically connected in series. The second clamping switch Dc2 may be a diode or an active switch, and the second clamping switch Dc2 in FIG. 7 is exemplified as a diode. The first terminal and second terminal of the second clamping capacitor Cc2 are coupled to the source of the first lower switch S5 and the cathode of the second clamping switch Dc2 respectively, and the anode of the second clamping switch Dc2 is coupled to the drain of the first lower switch S5. The second clamping circuit is configured to absorb the peak energy of the drain-source voltage at the moment of turning off the first lower switch S5 for clamping. The first clamping resistor Rc1 is coupled between the second terminal of the first clamping capacitor Cc1 and the second terminal of the second clamping capacitor Cc2. The series branch formed by the first clamping capacitor Cc1, the first clamping resistor Rc1 and the second clamping capacitor Cc2 is electrically connected to the first and second bridge arms in parallel. Accordingly, the first clamping capacitor Cc1 and the second clamping capacitor Cc2 may discharge to the bridge arms for maintaining the charge balance of the first clamping capacitor Cc1 and the second clamping capacitor Cc2.

Furthermore, in an embodiment, as shown in FIG. 7, the power converter 1 further includes a third clamping circuit, a fourth clamping circuit and a second clamping resistor Rc2. The third clamping circuit is electrically connected to the second upper switch S2 in parallel and includes a third clamping capacitor Cc3 and a third clamping switch Dc3 electrically connected in series. The third clamping switch Dc3 may be a diode or an active switch, and the third clamping switch Dc3 in FIG. 7 is exemplified as a diode. The first terminal and second terminal of the third clamping capacitor Cc3 are coupled to the drain of the second upper switch S2 and the anode of the third clamping switch Dc3 respectively, and the cathode of the third clamping switch Dc3 is coupled to the source of the second upper switch S2. The third clamping circuit is configured to absorb the peak energy of the drain-source voltage at the moment of turning off the second upper switch S2 for clamping. The fourth clamping circuit is electrically connected to the second lower switch S6 in parallel and includes a fourth clamping capacitor Cc4 and a fourth clamping switch Dc4 electrically connected in series. The fourth clamping switch Dc4 may be a diode or an active switch, and the fourth clamping switch Dc4 in FIG. 7 is exemplified as a diode. The first terminal and second terminal of the fourth clamping capacitor Cc4 are coupled to the source of the second lower switch S6 and the cathode of the fourth clamping switch Dc4 respectively, and the anode of the fourth clamping switch Dc4 is coupled to the drain of the second lower switch S6. The fourth clamping circuit is configured to absorb the peak energy of the drain-source voltage at the moment of turning off the second lower switch S6 for clamping. The second clamping resistor Rc2 is coupled between the second terminal of the third clamping capacitor Cc3 and the second terminal of the fourth clamping capacitor Cc4. The series branch formed by the third clamping capacitor Cc3, the second clamping resistor Rc2 and the fourth clamping capacitor Cc4 is electrically connected to the first and second bridge arms in parallel. Accordingly, the third clamping capacitor Cc3 and the fourth clamping capacitor Cc4 may discharge to the bridge arms for maintaining the charge balance of the third clamping capacitor Cc3 and the fourth clamping capacitor Cc4.

In summary, the present disclosure provides a power converter eliminating the current rush caused by switching switches through controlling the input switch, thereby reducing losses and increasing the efficiency of the power converter. Meanwhile, the heat energy generated by the power converter is reduced, and the operation safety of the power converter is enhanced. In addition, the power converter of the present disclosure may include the additional inductor to make the spatial arrangement more flexible and reduce the total losses in the applications of converters with high power density. Moreover, the power converter of the present disclosure may include the precharge circuit to precharge the storage capacitor for preventing the voltage across the input capacitor from causing the current rush to the voltage of the storage capacitor while starting the power converter, thereby avoiding loss and improving the reliability of the power converter. Furthermore, the power converter of the present disclosure may include the clamping circuit for clamping the drain-source voltage at the moment of turning off the switch.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power converter, comprising:
   a positive input terminal, a ground terminal, a positive output terminal and a negative output terminal, wherein the negative output terminal is coupled to the ground terminal;
   an input capacitor, wherein a first terminal and a second terminal of the input capacitor are electrically connected to the positive input terminal and the ground terminal respectively;
   an input switch, wherein a first terminal of the input switch is electrically connected to the first terminal of the input capacitor;
   a first bridge arm, electrically connected between a second terminal of the input switch and the ground terminal and comprising a first upper switch, a first middle switch and a first lower switch electrically connected in series, wherein the first upper switch and the first lower switch are electrically connected to the second terminal of the input switch and the ground terminal respectively, the first upper switch is connected to the first middle switch to form a first upper node, and the first middle switch is connected to the first lower switch to form a first lower node;
   a second bridge arm, electrically connected to the first bridge arm in parallel and comprising a second upper switch, a second middle switch and a second lower switch electrically connected in series, wherein the second upper switch and the second lower switch are electrically connected to the second terminal of the input switch and the ground terminal respectively, the second upper switch is connected to the second middle switch to form a second upper node, and the second middle switch is connected to the second lower switch to form a second lower node;
   a first storage capacitor, coupled between the first upper node and the second lower node;
   a second storage capacitor, coupled between the second upper node and the first lower node;
   a first output inductor, electrically connected between the first lower node and the positive output terminal;
   a second output inductor, electrically connected between the second lower node and the positive output terminal; and
   an output capacitor, coupled between the positive output terminal and the negative output terminal,
   wherein the input switch is configured to block a rush current between the input capacitor and the first storage capacitor and/or the second storage capacitor,
   wherein a control signal of the first upper switch and a control signal of the second upper switch have a same duty ratio and are out of phase with respect to each other by 180 degrees, a control signal of the first lower switch is complementary to the control signal of the second upper switch, and a control signal of the second lower switch is complementary to the control signal of the first upper switch,
   wherein when the duty ratio is less than or equal to 50%, the first middle switch and the second upper switch are turned on and off synchronously, the second middle switch and the first upper switch are turned on and off synchronously, and the input switch is kept in an on state.

2. The power converter according to claim 1, wherein when the duty ratio is greater than 50%, the first middle switch and the second lower switch are turned on and off synchronously, the second middle switch and the first lower switch are turned on and off synchronously, a switching frequency of the input switch is twice a switching frequency of the first upper switch, a turn-on duration of the input switch decreases as a duration of the first upper switch and the second upper switch both being in the on state increases, the input switch is alternate to turn off with the first upper switch synchronously and to turn off with the second upper switch synchronously, and the input switch is turned on when a voltage across the first bridge arm is less than a voltage across the input capacitor.

3. The power converter according to claim 2, wherein the input switch comprises a parasitic diode, an anode of the parasitic diode is electrically connected to the first terminal of the input switch, and a cathode of the parasitic diode is electrically connected to the second terminal of the input switch.

4. The power converter according to claim 2, further comprising an additional diode, wherein an anode of the additional diode is electrically connected to the first terminal of the input switch, and a cathode of the additional diode is electrically connected to the second terminal of the input switch.

5. The power converter according to claim 2, wherein in one switching cycle of the input switch, the turn-on duration of the input switch equals 0.5*Ts−2*Toverlap, where Ts is a switching cycle of the first upper switch and the second upper switch, and Toverlap is the duration of the first upper switch and the second upper switch both being in the on state in half switching cycle.

6. The power converter according to claim 1, wherein the first upper node is coupled to a source of the first upper switch and a drain of the first middle switch, the first lower node is coupled to a source of the first middle switch and a drain of the first lower switch, a drain of the first upper switch is coupled to the second terminal of the input switch, and a source of the first lower switch is coupled to the ground terminal.

7. The power converter according to claim 1, wherein the second upper node is coupled to a source of the second upper switch and a drain of the second middle switch, the second lower node is coupled to a source of the second middle switch and a drain of the second lower switch, a drain of the second upper switch is coupled to the second terminal of the input switch, and a source of the second lower switch is coupled to the ground terminal.

8. The power converter according to claim 1, wherein the first output inductor and the second output inductor are wound around a same magnetic core component to form an inverse coupling inductor, a first terminal and a second terminal of the first output inductor are electrically connected to the first lower node and the positive output terminal respectively, a first terminal and a second terminal of the second output inductor are electrically connected to the second lower node and the positive output terminal respectively, the first terminal of the first output inductor and the first terminal of the second output inductor are opposite in polarity, and the first terminal of the first output inductor and the second terminal of the second output inductor are identical in polarity.

9. The power converter according to claim 8, wherein an absolute value of a coupling coefficient between the first output inductor and the second output inductor is greater than 0.33, 0.5, 0.9 or 0.95.

10. The power converter according to claim 8, further comprising a third output inductor, wherein a first terminal of the third output inductor is electrically connected to the second terminal of the first output inductor and the second terminal of the second output inductor, and a second terminal of the third output inductor is electrically connected to the positive output terminal.

11. The power converter according to claim 1, wherein the positive output terminal and the ground terminal collaboratively receive an input voltage, the power converter further comprises a precharge circuit electrically connected to the positive input terminal, the first storage capacitor and the second storage capacitor, the precharge circuit is configured to provide a precharge voltage for precharging the first storage capacitor and the second storage capacitor while starting the power converter, and the precharge voltage is equal to a half of the input voltage.

12. The power converter according to claim 11, wherein the precharge circuit comprises a precharge power source, a first precharge switch and a second precharge switch, the precharge power source is electrically connected to the first terminal of the input capacitor, an anode and a cathode of the first precharge switch are electrically connected to the precharge power source and the second upper node respectively, and an anode and a cathode of the second precharge switch are electrically connected to the precharge power source and the first upper node respectively.

13. The power converter according to claim 12, wherein the positive input terminal, the precharge power source, the first precharge switch, the second storage capacitor, the first output inductor, the output capacitor, the input capacitor and the ground terminal form a first precharge loop.

14. The power converter according to claim 12, wherein the positive input terminal, the precharge power source, the second precharge switch, the first storage capacitor, the second output inductor, the output capacitor, the input capacitor and the ground terminal form a second precharge loop.

15. The power converter according to claim 1, wherein the first lower switch comprises two switches electrically connected in parallel and having a same control signal, and the first upper switch, the first middle switch and the two switches of the first lower switch are driven by drivers with a same specification.

16. The power converter according to claim 1, wherein the second lower switch comprises two switches electrically connected in parallel and having a same control signal, and the second upper switch, the second middle switch and the two switches of the second lower switch are driven by drivers with a same specification.

17. The power converter according to claim 1, further comprising a first clamping circuit, a second clamping circuit and a first clamping resistor, wherein the first clamping circuit is electrically connected to the first upper switch in parallel and comprises a first clamping capacitor and a first clamping switch electrically connected in series, a first terminal and a second terminal of the first clamping capacitor are coupled to a drain of the first upper switch and an anode of the first clamping switch respectively, and a cathode of the first clamping switch is coupled to a source of the first upper switch; the second clamping circuit is electrically connected to the first lower switch in parallel and comprises a second clamping capacitor and a second clamping switch electrically connected in series, a first terminal and a second terminal of the second clamping capacitor are coupled to a source of the first lower switch and a cathode of the second clamping switch respectively, and a anode of the second clamping switch is coupled to a drain of the first lower switch, the first clamping resistor is coupled between the second terminal of the first clamping capacitor and the second terminal of the second clamping capacitor.

18. The power converter according to claim 1, further comprising a third clamping circuit, a fourth clamping circuit and a second clamping resistor, wherein the third clamping circuit is electrically connected to the second upper switch in parallel and comprises a third clamping capacitor and a third clamping switch electrically connected in series, a first terminal and a second terminal of the third clamping capacitor are coupled to a drain of the second upper switch and an anode of the third clamping switch respectively, and a cathode of the third clamping switch is coupled to a source of the second upper switch; the fourth clamping circuit is electrically connected to the second lower switch in parallel and comprises a fourth clamping capacitor and a fourth clamping switch electrically connected in series, a first terminal and a second terminal of the fourth clamping capacitor are coupled to a source of the second lower switch and a cathode of the fourth clamping switch respectively, and an anode of the fourth clamping switch is coupled to a drain of the second lower switch; the second clamping resistor is coupled between the second terminal of the third clamping capacitor and the second terminal of the fourth clamping capacitor.

19. The power converter according to claim 1, wherein the rush current between the input capacitor and the first storage capacitor and/or the second storage capacitor is reduced through decreasing a turn-on duration of the input switch.

* * * * *